July 16, 1963
R. W. YOCUM
3,097,728
TAPERED END STUD AND STRUCTURE WITH TAPERED
END BORE TO PROVIDE A WEDGING LOCK
Filed Sept. 16, 1954
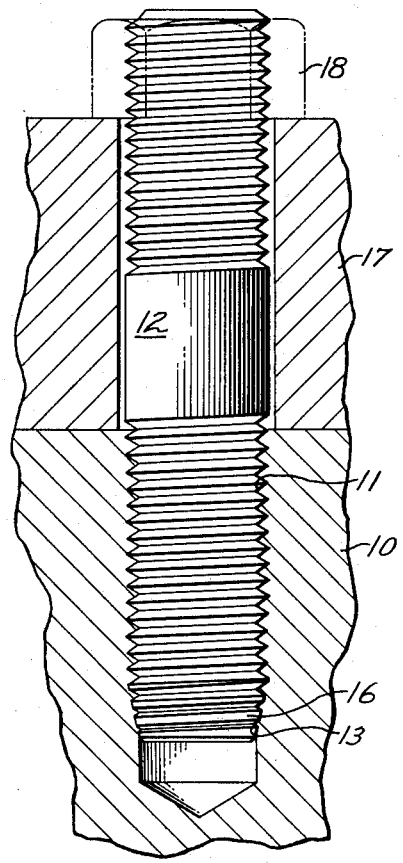
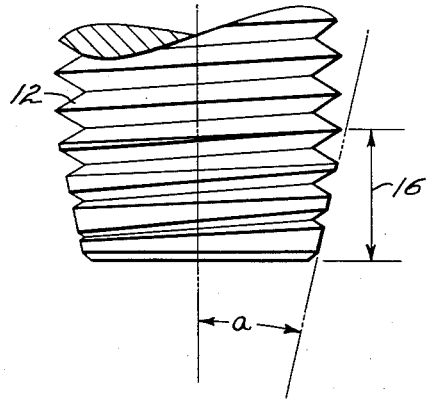
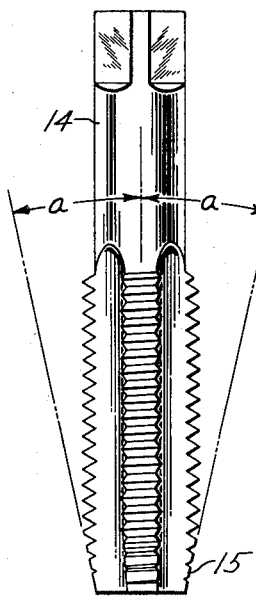
INVENTOR.
RALPH W. YOCUM
BY
Fryer and Johnson
ATTORNEYS 3,097,728
TAPERED END STUD AND STRUCTURE WITH TAPERED END BORE TO PROVIDE A WEDGING LOCK
Ralph W. Yocum, Peoria, Ill., assignor to Caterpillar Tractor Co., Peoria, Ill., a corporation of California
Filed Sept. 16, 1954, Ser. No. 456,570
2 Claims. (Cl. 189—36)

This invention relates to threaded studs and the members in which they are mounted and particularly to means for insuring uniformity in the torque required for inserting and removing studs of equal size.

It is a standard practice, in the dimensioning of studs and the tapped holes in the member in which the studs are to be mounted, to provide a tight or interference fit at the pitch diameters of the threads on the studs and the threads of the tapped holes. This interference fit is in the range of .002 to .004 of an inch undersize at the pitch diameter of the tapped hole into which a stud is to be driven, and is commonly referred to as a stud fit.

A disadvantage of this common stud fit is that most manufacturing practices cause a slight difference in the fit between individual studs of a given size and the tapped mounting holes. Consequently, the torque necessary to drive the studs and the torque required to break the studs loose will vary with different studs. It is also difficult to inspect and determine the exact amount of this interference fit, which must be held very closely within the specified tolerances to retain the stud in the threaded member so as to provide a predetermined break-loose torque which is defined as the amount of torque necessary to remove the stud.

It has also been a practice to insert a spring washer or a small quantity of resilient material into the bottom of the receiving hole and to provide a relatively loose fit, known as the American National Class III fit, between the threads of a stud and the tapped hole. This stud is freely threaded into the hole and compresses the resilient washer or material which resists further axial movement of the stud, causing one side of the stud threads to jam against the mating side of the threads in the tapped hole to provide the friction to resist a certain amount of break-loose torque. Disadvantages of this type of stud mounting are that an extra member must be inserted into the tapped hole before the stud is driven, and an insufficient retaining area is provided so that a relatively low torque may break the stud loose.

It is an object of this invention to provide studs and tapped holes therefor that will have substantial uniformity of driving and break-loose torque independently of close tolerance of the threaded parts and without employing resilient means between the stud and tapped hole. A further object of the invention is to provide a stud and tapped hole therefor with matching tapers which serve to limit the distance that the stud may be driven and to provide uniformity in driving and break-loose torque. Further and more specific objects and advantages of the invention and the manner in which it is practiced are made apparent in the following specification by reference to the accompanying drawings.

In the drawings:

FIG. 1 is a cross-sectional view of a portion of two members illustrating the use of a stud embodying the present invention in securing the members together;

FIG. 2 is an enlarged view of a portion of a tapered end stud showing the taper or chamfer at one end;

FIG. 3 is a side view of a standard commercially available tap showing the taper or chamfer at the thread-cutting or starting end.

In FIG. 1, a portion of a member in which a stud is to be mounted is indicated at 10 as provided with a tapped hole 11 to receive a stud 12. The threads of the tapped hole and the stud are cut to provide an American National Class III fit which is a relatively free fit as compared to the standard stud fit.

The threads at the lower portion 13 of the tapped hole 11 are imperfect threads the roots of which follow the contour of a truncated cone in accordance with standard tapping practices. In FIG. 3, a commercially available tap is shown at 14 provided with a conventional chamfer or taper indicated at 15 on the entry end of the tap which cuts the imperfect threads of the lower portion 13 of the tapped hole. In grinding this chamfer, many tap manufacturers have a specification range of three to five threads, with the chamfer starting just inside the root diameter of the first thread and proceeding upwardly and outwardly on the contour of a truncated cone terminating three to five threads above the end of the tap. This chamfer may be indicated in degrees of an angle measured in relation to the central axis of the tap. In conventional taps, the relative angle between the chamfer and the axis usually varies from approximately 7° to approximately 15°. The included angle between the sides of the chamfer would then vary from approximately 14° to approximately 30°.

In accordance with the present invention and as shown in FIG. 2, a taper or chamfer is provided at one end 16 of the stud 12 which is to be threaded into the tapped hole 11 of the member 10 in which the stud is to be mounted. This taper is ground or otherwise formed on the stud either before or after the threads are formed and it is immaterial whether the threads are formed by cutting with a die or whether they are rolled on in a conventional manner. The angle of taper, indicated by "$a$," which is measured in relation to the central axis of the stud may be of any degree which will give a wedging action as the stud reaches the tapered portion 13 of the tapped hole; however, there is a practical limit as to how great an angle can be provided on the tapered end of the stud. For example, if an angle of 45° or more were ground on the end of the stud, little wedging action would be obtained and the result would be to jam the threads of the stud against the mating threads in the tapped hole in the same manner as though a resilient member were placed beneath the stud. Therefore, very little torque effort would be required to break the stud loose. At the other extreme, if a very small angle of taper were provided on the same number of threads the area of the stud in contact with the tapered portion 13 of the tapped hole at the terminus of the threads would be very small; however, the wedging action would be very great and might exceed the tensile strength of the part 10 so that the material around the hole would be cracked or broken.

The taper at the end of the stud may vary greatly in degree but is preferably formed at the same angle as that of the tap so that the angles "$a$" shown in FIGS. 2 and 3 are the same. With these angles the same the crest of the incomplete threads on the stud will mate with the flat root portions on the threads of the inner portion 13 of the tapped hole and a large wedging area is provided.

The angle selected should be small enough to provide good wedging action but sufficiently large to avoid cracking around the tapped hole under the torque required to insert the stud. It is found that an angle of 12½° meets these requirements and is also practical in the manufacture of most taps.

The remainder of the threads of the stud portion as well as the threads of the tapped hole are manufactured according to the American National Class III fit. Therefore, the stud 12 may be freely threaded into the tapped hole 11 until the tapered portion 16 contacts the tapered portion 13 of the tapped hole. Further torque applied to the stud will cause this tapered portion to wedge into the tapering tapped hole. In driving a series of studs, the drive-in torque of the several tapered-end studs will be relatively uniform as distinguished from the variations of drive-in torques necessary to drive studs into tapped holes having the conventional stud fit of .002 to .004 interference. Likewise, the force required to remove the stud, referred to as break-loose torque, is very uniform in a series of tapered end studs. Also, this break-loose torque of the tapered stud is higher than the break-loose torque of a stud having a conventional stud fit between the mating threads of the tapped holes.

Another advantage of this tapered end stud is that the stud may be removed very easily after first overcoming the wedging action of the two engaging tapers. As soon as the stud is free at the tapered portion, it may be removed with very little turning effort since the mating threads are more freely fitted than those of a standard stud fit. The same tapped hole may be used again; whereas, with the conventional stud fit, once a stud has been driven into the tapped hole and then removed, a slight amount of material is removed from the threaded hole. If another stud is then driven into the threaded hole, the interference is less and therefore the stud is retained by a lesser force and the break-loose torque will be much lower.

Because the taper of the stud mates with the taper of the tapped hole the extent to which the stud enters the hole is limited. Consequently the stud, even though inserted and removed several times will project sufficiently far to extend through a part to be secured as shown at 17 in FIG. 1 and accommodate a nut indicated by broken lines at 18.

Furthermore since the required drive-in and break-out torque are established by the tapered fit the necessity of close tolerances in making threads is eliminated so that slight wear on taps and dies is not critical and the cost of regrinding and replacing these tools is greatly reduced.

I claim:

1. The combination which comprises a member of solid substantially non-expandable structure having a tapped hole therein, a second member to be secured to the first member and having a plain through hole for alignment with said tapped hole, a solid stud-like member threaded on both ends with the threads on a first end being uninterrupted and fitting said tapped hole, a nut to fit the opposite end of said stud-like member to secure the second member tightly against the first member, the threads in said tapped hole being straight throughout the greater part of the length and tapered only adjacent its inner end where the roots of the threads follow the contour of a truncated cone, the stud-like member having straight threads throughout most of its length on its said first end and being tapered only adjacent its end providing the crests of the threads with a complementary frusto-conical contour, and the angle of said tapers being such as to provide a wedging action which limits the depth to which the stud-like member can be threaded into the tapped hole.

2. The combination which comprises a member of solid substantially non-expandable structure having a tapped hole therein, a second member to be secured to the first member and having a plain through hole for alignment with said tapped hole, a solid stud-like member threaded on both ends with the threads on a first end being uninterrupted and fitting said tapped hole, a nut to fit the opposite end of said stud-like member to secure the second member tightly against the first member, the threads in said tapped hole being straight throughout the greater part of the length and tapered only adjacent its inner end where the roots of the threads follow the contour of a truncated cone, the stud-like member having straight threads throughout most of its length on its said first end and being tapered only adjacent its end providing the crests of the threads with a complementary frusto-conical contour, the angle of said tapers being such as to provide a wedging action which limits the depth to which the stud-like member can be threaded into the tapped hole, and the straight threads on said first end of the stud-like member being relatively loosely fitted in said tapped hole whereby it may be freely threaded into the hole but firmly and compressively engaged therein when a final torque is applied to cause the wedging action between the tapered parts of the tapped hole threads and the stud threads.

References Cited in the file of this patent

UNITED STATES PATENTS

| | | |
|---|---|---|
| 214,804 | Allison | Apr. 29, 1879 |
| 232,432 | Allison | Sept. 21, 1880 |
| 1,394,608 | Davern | Oct. 25, 1921 |
| 2,021,704 | Thatcher et al. | Nov. 19, 1935 |
| 2,094,491 | Janata | Sept. 28, 1937 |
| 2,136,458 | Olson | Nov. 15, 1938 |
| 2,421,181 | Batchelder | May 27, 1947 |
| 2,441,442 | Place et al. | May 11, 1948 |
| 2,470,924 | Flogaus | May 24, 1949 |

FOREIGN PATENTS

| | | |
|---|---|---|
| 874,160 | France | Apr. 20, 1942 |